United States Patent [19]

Sayanagi et al.

[11] Patent Number: 4,729,017
[45] Date of Patent: Mar. 1, 1988

[54] STEREOSCOPIC DISPLAY METHOD AND APPARATUS THEREFOR

[75] Inventors: Kazuo Sayanagi, Yokohama; Hisashi Nakatsui, Kawasaki, both of Japan

[73] Assignee: Canon Kabushiki Kaisha, Tokyo, Japan

[21] Appl. No.: 832,650

[22] Filed: Feb. 25, 1986

[30] Foreign Application Priority Data

Feb. 28, 1985 [JP] Japan ................. 60-37371

[51] Int. Cl.$^4$ .................. H04N 13/00; H04N 13/04
[52] U.S. Cl. ......................... 358/88; 358/3; 340/795
[58] Field of Search ............ 358/88, 92, 3, 91; 340/795, 796; 350/132, 144

[56] References Cited

U.S. PATENT DOCUMENTS

| 3,334,179 | 8/1967  | Winnek | 358/92   |
| 4,062,045 | 12/1977 | Iwane  | 358/88   |
| 4,122,484 | 10/1978 | Tan    | 358/88 X |
| 4,399,456 | 8/1983  | Zalm   | 358/92   |

FOREIGN PATENT DOCUMENTS

| 3145216  | 5/1983 | Fed. Rep. of Germany | 358/88 |
| 58-84589 | 5/1983 | Japan                | 358/88 |
| 0738194  | 6/1980 | U.S.S.R.             | 358/3  |

Primary Examiner—James J. Groody
Assistant Examiner—E. Anne Faris
Attorney, Agent, or Firm—Fitzpatrick, Cella, Harper & Scinto

[57] ABSTRACT

A lattice plate is arranged in front of and in a spaced relation from an image display screen. An image to be displayed is divided into pixels each of which is modulated to a grid having a grid interval determined by far-near information carried by the pixel. When a viewer views the screen through the lattice plate, he/she can view a steroscopic image.

6 Claims, 6 Drawing Figures

STEREOSCOPIC DISPLAY METHOD AND APPARATUS THEREFOR

BACKGROUND OF THE INVENTION

1. Field of the Invention

The present invention relates to stereoscopic display method and apparatus therefor for displaying an image with a stereoscopic feeling to a viewer.

2. Related Background Art

Various methods for stereoscopically displaying an image have been proposed.

(1) In a first method, a stereoscopic feeling is imparted by presenting chromatic distinctions to two eyes of a viewer by time shutters, color filters or polarization filters. In this method, cyan and magenta color filters are provided in left and right lenses of eyeglasses and two display images represented in cyan and magenta are displayed in superposition. The viewer views the display images through the color filter eyeglasses so that a stereoscopic feeling is imparted to the viewer. This method has been known from the old time as a stereoscopic viewing method and used in a stereoscopic cinema or a stereoscopic television. However, since this method needs the eyeglasses, the stereoscopic feeling is not imparted without the eyeglass.

(2) In a second method, a lenticular screen is used. In this method, the lenticular lens having semi-circular molded fine lenses is applied on a surface of a printed material and a viewer views the printed material through the lenticular lens so that a stereoscopic feeling is imparted to the viewer.

In this method, a degree of stereoscopic feeling differs depending on a radius of curvature and an interval of the lenses of the lenticular lens, and the stereoscopic feeling is imparted or not imparted depending on a viewing position of the viewer to the image. Thus, a high quality is not attained.

(3) In a third method, a holography which utilizes interference of a laser is used. This method is superior to the above methods (1) and (2) in the stereoscopic feeling obtained but inferior to the above two methods in a color display. It is difficult to obtain a stereoscopic display with a high color reproducibility. An optical system is more complex than those of other methods and hence this method is fairly expensive.

(4) In a fourth method, the stereoscopic feeling is obtained by a so-called go-around effect. In this method, a laser beam is swung in a sequence programmed in a computer and a movement of a certain color beam is observed, or a display screen which is as large us a cinema screen is used so that a stereoscopic feeling is imparted by a stereoscopic cinema method such as a cinerama method.

In this method, the stereoscopic feeling is imparted by the large display screen combined with a stereoscopic sound effect and it is not a real stereoscopic display.

Thus, the prior art stereoscopic display methods have various defects.

SUMMARY OF THE INVENTION

It is an object of the present invention to remove the above-mentioned defects in the prior art.

It is another object of the present invention to provide improved stereoscopic display method and apparatus therefor.

It is other object of the present invention to provide stereoscopic display method and apparatus therefor which can display a stereoscopic image with a simple construction.

It is other object of the present invention to provide stereoscopic display method and apparatus therefor which can display an image with a high stereoscopic feeling.

It is other object of the present invention to provide stereoscopic display method and apparatus which do not require a viewer to put special eyeglasses and allows the viewer to view a stereoscopic image by natural eyes of the viewer with a relatively simple construction.

Other objects of the present invention will be apparent from the following description of the invention.

DESCRIPTION OF THE PREFERRED EMBODIMENTS

Figure 1:
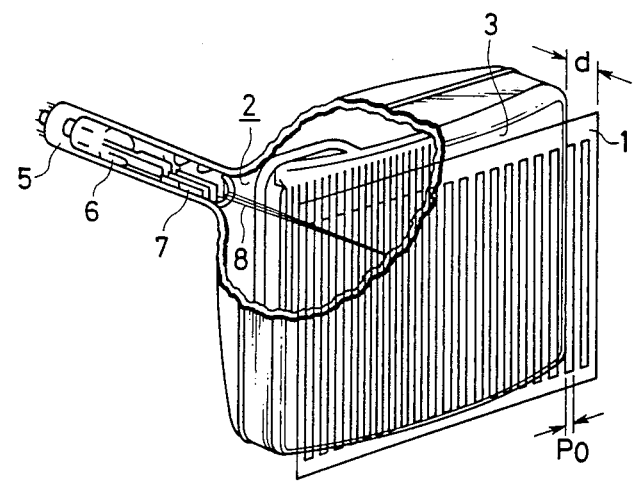
FIG. 1 is a perspective view of a display device of the present invention.
Figure 2:
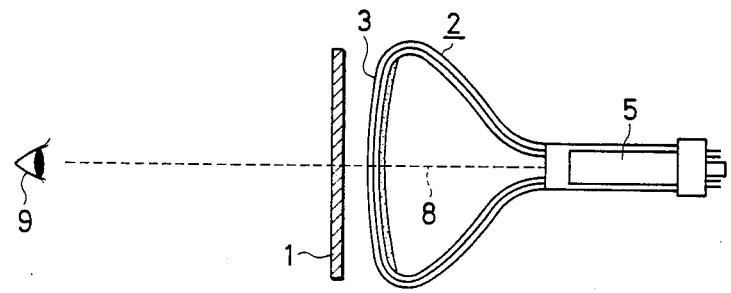
FIG. 2 is a longitudinal sectional view of an internal structure of FIG. 1.

FIGS. 1 and 2 show a CRT tube of a television apparatus to which the present invention is applied. Numeral 1 denotes a lattice plate, numeral 2 denotes a CRT tube, numeral 3 denotes a signal display screen, numeral 5 denotes an electron gun, numeral 6 denotes a main electron lens, numeral 7 denotes a deflection plate and numeral 8 denotes a scan beam. The lattice plate 1 having a number of light transmissive grooves formed in vertical stripe along a sub-scan direction is arranged in front of the signal display screen (which is usually a fluorescent display screen which emits fluorescent by the scan beam 8) of the CRT tube 2.

Figure 3:
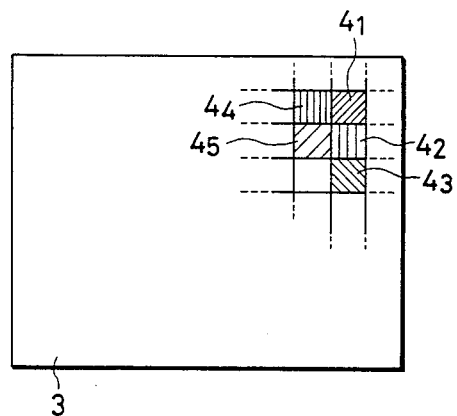
FIG. 3 shows a partial lattice displayed on a signal display screen of FIG. 1.

In FIG. 3, numerals $4_1$ to $4_5$ (represented by numeral 4) denote partial grids projected on the signal display screen 3 in response to a video signal supplied to the CRT tube 2. When a viewer who sits in front of the television apparatus views the scan lines projected on the signal display screen 3 through the lattice plate 1, the viewer can observe that the partial grids 4 have different grid intervals.

Figure 4:
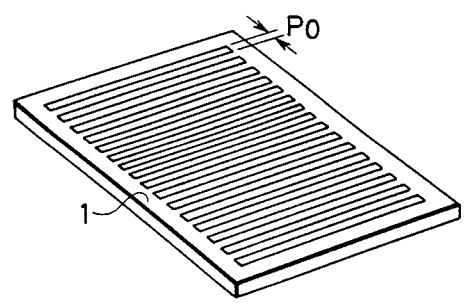
FIG. 4 is a perspective view of a lattice plate of FIG. 1.

When the lattice interval of the lattice plate 1 is Po as shown in FIG. 4 and the grid intervals of the partial grids $4_1$ to $4_5$ formed by the scan lines of the television are pi (i=1 to 5), an optical image of the partial grids 4 which the viewer who is spaced from the CRT tube 2 by a certain distance views by his/her eyes through the vertical lattice plate 1 in front of the display screen 3, that is, a brilliant point viewed from the eyes 9 of the viewer appear as if it comes from a point deeper by D from the surface of the display screen 3 by a diffraction effect. The distance D is represented by $$D = d \cdot \frac{Pi}{Po - Pi} \quad (Po > Pi) \tag{1}$$

where d is a distance between the vertical lattice plate 1 and the signal display screen 3.

By changing Pi and the intensity of the scan beam 8 in accordance with the stereoscopic information to be displayed, the viewer can view the stereoscopic image.

Figure 5:
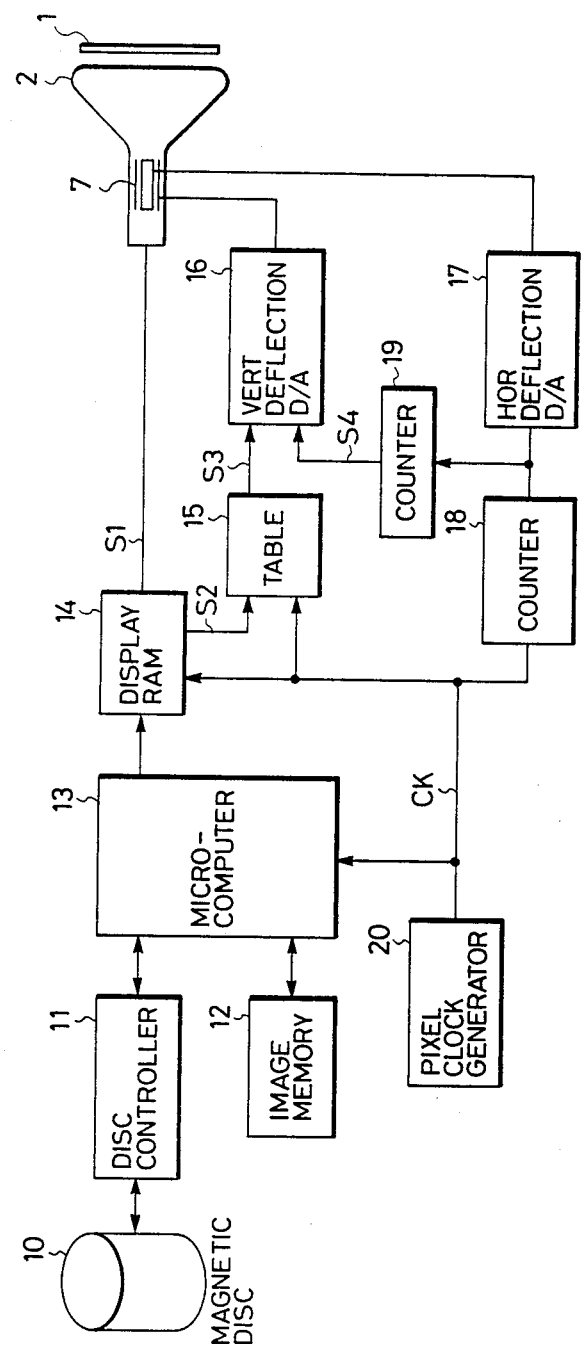
FIG. 5 is a block diagram of the display device in the embodiment of the present invention.
Figure 6:
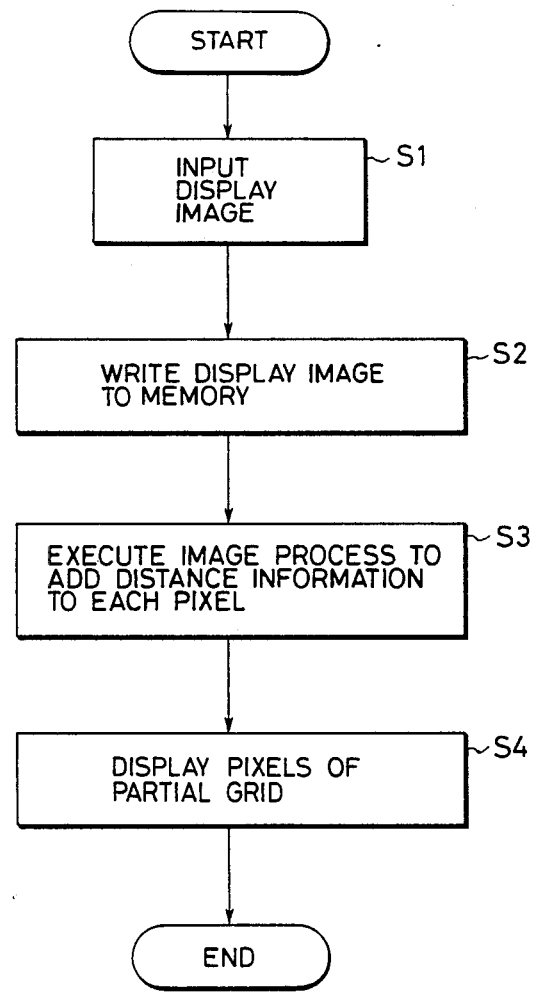
FIG. 6 is a flow chart which shows an operation of the embodiment.

A stereoscopic display apparatus of the present invention is explained with reference to a block diagram of FIG. 5 and a flow chart of FIG. 6. In FIG. 5, numeral 13 denotes a microcomputer including RAM, ROM and CPU, numeral 10 denotes a magnetic disk, numeral 11 denotes a disk controller which stores and reads out a video signal into and from the magnetic disk 10 in accordacne with an instruction from the microcomputer 13, numeral 12 denotes a memory which temporarily stores the video signal read from the magnetic disk 10, and numeral 14 denotes a display RAM which stores pixel signals for the display screen 3 of the CRT tube 2. Each of the pixel signals stored in the RAM 14 has intensity signal S1 to turn on or off the scan beam 8 and pattern information (far-near information) S2 which represents an output pattern of the pixel signal. Each pixel signal forms the partial grid on the display screen 3, and the grid interval of the partial grids is determined by the pattern information S2. Numeral 15 denotes a table (memory) which receives the pattern information S2 as an address data and outputs a deflection data S3 to a vertical deflection D/A (digital-analog) converter 16, and numeral 20 denotes a pixel clock generator which generates a pixel clock for timing the overall system. The pixel clock generated by the pixel clock generator 20 is supplied to the microcomputer 13, display RAM 14, table 15 and counter 18 so that they are synchronized. Numeral 18 denotes the counter which is counted up by the pixel clock and reset for each line scan. The count in the counter 18 is supplied to a horizontal deflection D/A (digital-analog) converter 17 to generate a sawtooth wave. Numeral 19 denotes a counter which counts the output of the counter 18. The output S4 of the counter 19 and the output S3 of the table 15 are supplied to the vertical deflection D/A converter 16. The counter 19 increments the data for each line scan and outputs the data S4 for the high order bit of the vertical deflection D/A converter 16.

The operation of the circuit shown in FIG. 5 is now explained in detail with reference to the flow chart of FIG. 6. The flow chart shown in FIG. 6 is programmed and stored in the ROM in the microcomputer 13.

In a step S1, a stereoscopic display image is fetched from the magnetic disk 10. In a step S2, it is written into the memory 12. In a step S3, the display image read from the memory 12 is processed to impart far-near information to the pixels. In the present embodiment, the image is processed by a CPU such as microcomputer. Where the stereoscopic image is displayed on the CRT screen by using the pixel signals having the far-near position (far-near information) set thereon, the processing is facilitated. In a step S4, the pixel data decomposed into partial grids 4 having different grid intervals are displayed on the display screen 3. When it is viewed through the lattice palte 1, a stereoscopic image appears.

In the present embodiment, one screen of pixel information to be displayed on the CRT is stored in the display RAM 14. As described above, each pixel information has the intensity information S1 to turn on or off the scan beam 8 and the pattern information S2 which represents the grid interval. The pattern information S2 read from the RAM 14 is used to access the table 15, which outputs the deflection data S3. The deflection data S3 and the output S4 from the counter 19 are supplied to the vertical deflection D/A converter 16, which generates the sawtooth wave voltage for defining the grid interval, for each pixel, and the voltage is applied to the deflection plate 7.

The data from the counter 18 is converted to an analog signal, that is, a sawtooth wave voltage by the horizontal deflection D/A converter 17, and the voltage is applied to the defection plate 7.

Since different pattern information S2 is produced for each pixel, patterns (partical grids) having different grid interval for each pixel are displayed on the display screen 3.

In order to generate oblique patterns such as $4_1$, $4_3$ and $4_5$ shown in FIG. 3, the phase of the sawtooth wave outputted from the D/A converter 16 may be changed. The oblique pattern may also be generated by changing the phases of both sawtooth waves generated by the D/A converters 16 and 17. In this case, the output of the table 15 is also supplied to the horizontal deflection D/A converter 17.

The lattice interval Po is usually set to 0.1 to 0.2 mm, and for the television image, it may be 0.1 to 0.5 mm and for the large screen such as a video projector, it may be 0.5 to 2 mm. For example, when the lattice interval Po of the lattice plate 1 is 0.5 mm and the grid interval Pi of the partial grid is 0.4 mm, the brilliant point appears as if it comes from a depth of 1 m in accordance with the formula (1) when it is viewed 25 cm in front of the television screen. When Pi changes to 0.1 mm, the brilliant point appears as if it come from the depth of 62.5 mm in accordance with the formula (1).

Thus, the brilliant point appears as if it comes from the depth of 1 m or 62.5 mm although the position of the viewer does not change. In the color television, the respective color signals appear on the partial grids 4 of FIG. 3 so that the brilliant points for the respective colors appear near or far depending on the grid interval of the partial grid.

When the lattice interval Po in the vertical stripes of the lattice plate 1 is 0.1 to 0.2 or more, the vertical grooves can be readily formed by a conventional photo-etching process. In order to manufacture a high strength lattice plate 1 having light non-transmissive areas of 10 to 100$\mu$ width, a non-trasmissive film may be formed on glass substrate by a thin metal film or calcogenide.

In the display method of the present embodiment, the partial grids 4 having grid intervals determined by the far-near information is formed and displayed on the signal display screen 3 of the CRT 2 in accordance with the electrical signal (input video signal) including the far-near information supplied to the CRT 2. The present invention is also applicable to a transmission type screen on which a graphic pattern is projected by a color slide film.

As described hereinabove, in accordance with the present invention, the vertical stripe lattice plate is arranged in front of the image display screen of the stereoscopic display apparatus, and the image is displayed by the partial grids of different grid intervals in accordance with the distance information of the pixel. Accordingly, the viewer can view various brilliant points having different distance feelings (minimum optical areas distinguishable by a resolution of eyes).

Thus, as the viewer selects the viewing point at any point in front of the lattice plate, he/she can view a stereoscopic image of a desired depth. For example, when Pi = Po, he/she feels as if the light comes from an infinite point. When the distance d between the image display screen and the vertical lattice plate is large, the stereoscopic image effect is enhanced.

The present invention is not limited to the embodiments described above but various modifications thereof may be made within the scope of the claims.

We claim:

1. A stereoscopic display apparatus comprising:
   image display means for displaying an image, wherein said image display means includes output means for dividing an image to be displayed into a plurality of pixels and converting each of the pixels into fine area grids having a grid interval being variable in accordance with distance information of the pixel, and for outputting the converted pixel to the image display screen; and
   a lattice plate arranged in front of and in a spaced relation from said image display screen, said lattice plate having a plurality of lattices.

2. A stereoscopic display apparatus according to claim 1, wherein said lattice plate has a plurality of lattices, said lattice having a predetermined lattice interval.

3. A stereoscopic disply apparatus according to claim 2 wherein a lattice interval of said lattice plate is larger than the grid interval of the pixel.

4. A stereoscopic display apparatus according to claim 1, further comprising storage means for storing pixel data including pattern information for representing the grid interval.

5. A stereoscopic display apparatus according to claim 4, wherein said output means converts each pixel into fine area grids in accordance with said pattern information.

6. A stereoscopic display method comprising the steps of:
   arranging a lattice plate having a plurality of lattices, in front of and in a spaced relation from an image display screen;
   dividing an image to be displayed into a plurality of pixels; and
   converting each pixel into grids having a grid interval determined by distance information of the pixel and outputting the converted pixel to the image display screen.

* * * * *

UNITED STATES PATENT AND TRADEMARK OFFICE
CERTIFICATE OF CORRECTION

PATENT NO. : 4,729,017
DATED : March 1, 1988
INVENTOR(S) : KAZUO SAYANAGI

Page 1 of 2

It is certified that error appears in the above-identified patent and that said Letters Patent is hereby corrected as shown below: On The Title Page:

AT [57] IN THE ABSTRACT

Line 7, "steroscopic" should read --stereoscopic--

COLUMN 1

Line 19, "viewes" should read --views--.
      Line 26, "eyeglass" should read --eyeglasses--.

COLUMN 2

Line 1, "other" should read --another--.
      Line 5, "other" should read --another--.
      Line 9, "other" should read --another--.
      Line 10, "apparatus which" should read --apparatus therefor which--.
      Line 11, "put" should read --put on--.
      Line 41, "stripe" should read --stripes--.
      Line 43, "fluourescent" should read --fluorescent light--.

COLUMN 3

Line 13, "cordacne" should read --cordance--.
      Line 60, "lattice palte 1," should read "lattice plate 1,--.

UNITED STATES PATENT AND TRADEMARK OFFICE
CERTIFICATE OF CORRECTION

PATENT NO. : 4,729,017
DATED : March 1, 1988
INVENTOR(S) : KAZUO SAYANAGI

Page 2 of 2

It is certified that error appears in the above-identified patent and that said Letters Patent is hereby corrected as shown below:

COLUMN 4

Line 12, "(partical grids)" should read --(partial grids)--.
      Line 13, "interval" should read --intervals--.
      Line 32, "come" should read --comes--.
      Line 42, "0.1 to 0.2" should read --0.1 to 0.2 mm".
      Line 46, "non-trasmissive" should read --non-transmissive--.

COLUMN 6

Line 3, "disply" should read --display--.

Signed and Sealed this

Twenty-second Day of November, 1988

*Attest:*

DONALD J. QUIGG

*Attesting Officer*      *Commissioner of Patents and Trademarks*